US011636527B2

(12) United States Patent
Shahul Hamid et al.

(10) Patent No.: US 11,636,527 B2
(45) Date of Patent: Apr. 25, 2023

(54) PERSONALIZATION BASED ON PRIVATE PROFILE MODELS

(71) Applicant: International Business Machines Corporation, Armonk, NY (US)

(72) Inventors: Ahamed Jalaldeen Shahul Hamid, Bangalore (IN); Chenthilraj Lakshmikanthan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/016,673

(22) Filed: Sep. 10, 2020

(65) Prior Publication Data

US 2022/0076316 A1    Mar. 10, 2022

(51) Int. Cl.
*G06Q 30/00* (2023.01)
*G06Q 30/0601* (2023.01)
*G06N 20/00* (2019.01)

(52) U.S. Cl.
CPC ......... *G06Q 30/0631* (2013.01); *G06N 20/00* (2019.01)

(58) Field of Classification Search
CPC ......... G06Q 30/06–08; G06Q 30/0631; G06N 20/00
See application file for complete search history.

(56) References Cited

U.S. PATENT DOCUMENTS

| 6,853,982 | B2 * | 2/2005 | Smith | G06Q 30/0603 |
| | | | | 705/26.7 |
| 8,484,142 | B2 | 7/2013 | Pinckney | |
| 9,021,363 | B2 | 4/2015 | Blake, III | |
| 9,712,520 | B1 * | 7/2017 | Canavor | H04L 67/14 |
| 10,373,230 | B2 | 8/2019 | Walti | |
| 2009/0171755 | A1 * | 7/2009 | Kane | G06Q 40/12 |
| | | | | 705/14.16 |
| 2011/0066497 | A1 * | 3/2011 | Gopinath | G06Q 30/0255 |
| | | | | 705/14.53 |
| 2015/0170053 | A1 | 6/2015 | Miao | |
| 2015/0379732 | A1 * | 12/2015 | Sayre, III | G06Q 30/0623 |
| | | | | 382/164 |

OTHER PUBLICATIONS

Google says machine learning is the future. So I tried it myself, Alex Hern Jun. 28, 2016; (Year: 2016).*
Recommended For You: How machine learning helps you choose what to consume next, Jennifer Wei, Aug. 28, 2017; (Year: 2017).*
Machine Learning: What it is and why it matters, SAS, Jan. 7, 2014. (Year: 2014).*

(Continued)

*Primary Examiner* — Ethan D Civan
(74) *Attorney, Agent, or Firm* — Stephanie L. Carusillo

(57) ABSTRACT

In an approach for constructing private profile machine learning models for recommending products to a user, a processor gathers user data associated with interactions of the user on an ecommerce website. A processor analyzes the user data using machine learning (ML) techniques. A processor trains a private profile ML model on the analyzed user data, wherein the private profile ML model is stored on a private storage of the user. A processor predicts a product recommendation using the private profile ML model. A processor outputs the product recommendation.

17 Claims, 3 Drawing Sheets

(56) References Cited

OTHER PUBLICATIONS

What is API: Definition, Specifications Types Documentation (Year: 2020).*

Authors et al. Disclosed Anonymously, "A Cognitive Method to Implement Personalized Customized and Reliable Clothing Recommendation", An IP.com Prior Art Database Technical Disclosure, IP.com No. IPCOM000255524D, IP.com Electronic Publication Date: Sep. 29, 2018, 4 Pages.

Shokri et al., "Preserving Privacy in Collaborative Filtering through Distributed Aggregation of Offline Profiles", Published in Proceedings of the Third ACM Conference on Recommender Systems, Oct. 2009, 8 Pages.

Wang et al., "Toward Privacy-Preserving Personalized Recommendation Services", Published by Elsevier LTD on behalf of Chinese Academy of Engineering and Higher Education Press Limited Company, Feb. 2018, 8 Pages.

* cited by examiner

PERSONALIZATION BASED ON PRIVATE PROFILE MODELS

BACKGROUND

The present invention relates generally to the field of product recommendation, and more particularly to constructing private profile models using machine learning techniques for recommending products to a user.

Customer experience is the perception customers create based on their interactions with a company, whether they take place in-store, online, or over the phone. For electronic commerce (e-commerce) and mobile commerce (m-commerce), which is business transactions that occur over the Internet, customer experience is about how effectively customers feel a business communicates and connects with them, which can influence their future buying behavior with that business. Personalization of a customer experience can help make customers feel valued and appreciated by making things easier for customers. One known method of personalizing the customer experience is through product recommendation based on a customer's purchase history and the customer's browsing history on the e-commerce or m-commerce website.

SUMMARY

Aspects of an embodiment of the present invention disclose a method, computer program product, and computer system for constructing private profile models, in which the private profile ML models are stored in a private storage of the user, using machine learning techniques for recommending products to a user. A processor gathers user data associated with interactions of the user on an ecommerce website. A processor analyzes the user data using machine learning (ML) techniques. A processor trains a private profile ML model on the analyzed user data, wherein the private profile ML model is stored on a private storage of the user. A processor predicts a product recommendation using the private profile ML model. A processor outputs the product recommendation.

In some aspects of an embodiment of the present invention, responsive to the user accessing an ecommerce website and providing an application program interface (API) to the ecommerce website, a processor gathers the user data, wherein the API provides access to the private profile ML model.

In some aspects of an embodiment of the present invention, the user data includes product images and text descriptions of products that the user interacted with on the ecommerce website.

In some aspects of an embodiment of the present invention, a processor gathers the user data by injecting a JavaScript in a web application of the ecommerce website that tracks interactions and events of the user and stores the interactions and the events of the user as the user data in a private storage of the user.

In some aspects of an embodiment of the present invention, a processor analyzes product images of the user data using object detection, color detection, and text detection to identify preferences of the user for a particular product, wherein the preferences include at least one of product type, color, and pattern. A processor analyzes text descriptions of the user data using supervised text classification ML algorithms to capture additional preferences of the user from metadata of the text descriptions, wherein the additional preferences include at least one of price, size, return policy, and user rating.

In some aspects of an embodiment of the present invention, a processor collects inferred data based on the analyzed user data and trains the private profile ML model using the inferred data.

In some aspects of an embodiment of the present invention, responsive to the ecommerce website invoking the API, a processor enables the ecommerce website to use the private profile ML model to provide product recommendations to the user.

DETAILED DESCRIPTION

Figure 1:
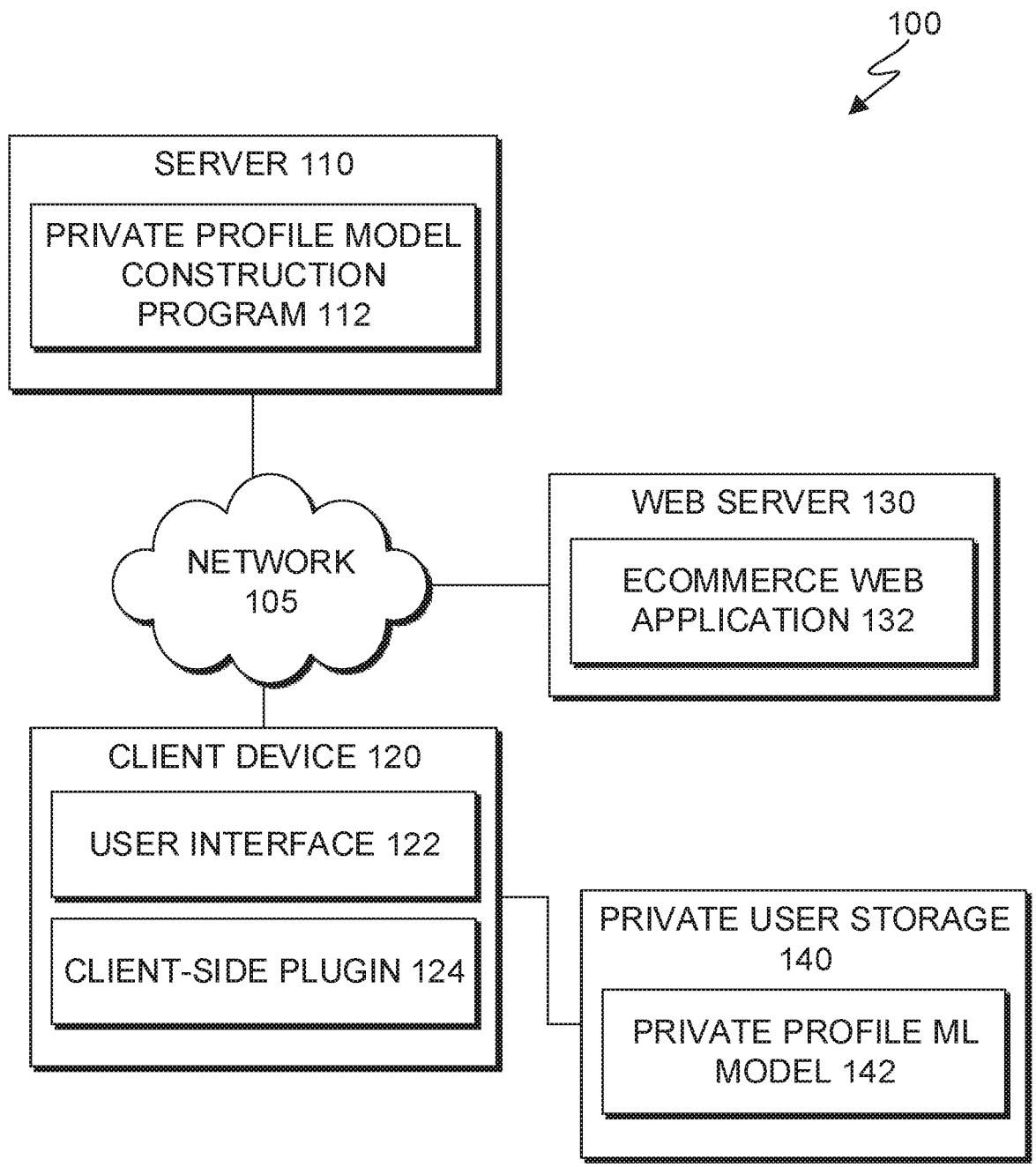
FIG. 1 depicts a block diagram of a distributed data processing environment, in accordance with an embodiment of the present invention.

Embodiments of the present invention recognize that many e-commerce/m-commerce websites use customer experience management solutions to personalize the customer experience by recommending products that closely match a customer's interest based on customer preferences, which are generally captured using the customer's buying history and browsing history on the e-commerce website. As used herein, e-commerce applications/websites include m-commerce applications/websites. Using the customer's buying history and browsing history can lead to inaccurate recommendations, which can lead to a bad experience for the customer. Moreover, many customers may not be willing to disclose their personal preferences due to growing data privacy concerns. On the e-commerce website's end, considering the growing volume of customers shopping online, it is becoming more and more difficult to track personal preferences of customers and recommend products in real-time.

Embodiments of the present invention recognize several disadvantages to known solutions for personalization of the customer experience for an e-commerce website: (1) make use of text-based user preference captured from buying history and browsing history of the website, which can be inaccurate; (2) do not analyze user behavior using artificial intelligence (AI) based private profile models using machine learning (ML) techniques; (3) store preferences of all users in a centralized location from which the user preferences are fetched, processed, and rendered, which is a disadvantage for many users not willing or wanting to have their personal preferences captured and stored in a centralized location and a disadvantage for the e-commerce business having to track and maintain personal preferences for a multitude of customers; and (4) keep user preferences for various e-commerce websites separately thus lacking a consolidated view of customer preferences across multiple websites.

Embodiments of the present invention provide a system and method for constructing private profile models, in which the private profile ML models are stored in a private storage of the user, for recommending products by analyzing a user's interaction with an e-commerce website using ML techniques. Embodiments of the present invention identify user personal preferences either in an automated way using object detection on the website or through user input of personal preferences (e.g., colors, brands, sizes) for different products of various categories of their choice as a training data set.

When a user accesses an e-commerce website and opts into sharing their private profile model, a ML model in the user's private storage will be shared with the e-commerce application. On the client side, the e-commerce application is then able to dynamically filter, fetch, and recommend products based on the user-specific private profile ML model. Embodiments of the present invention store the private profile ML models locally in the client environment or in a cloud account of the user. Embodiments of the present invention continuously update and enrich the private profile ML models based on user interactions and user inputs. Embodiments of the present invention process recommendations of products based on the user's personal preferences at the client machine using the private profile ML models shared by the user. This enriches the processing power and scalability of e-commerce applications to support user personalization for millions of customers.

Several advantages of the present invention can be recognized: (1) by using the private profile ML models, e-commerce websites can accurately provide product recommendations and a customer can view the products of their choice to help make buying decisions easier and faster; (2) the private profile ML models help in providing personalized customer experiences; (3) privacy of users is ensured by not sharing their personal choices to different e-commerce applications; (4) a user's private profile ML models can be used by different e-commerce applications to recommend products to the user.

Embodiments of the present invention construct the private profile ML model using user data and leverage the private profile ML model to provide user-specific product recommendations. Embodiments of the present invention construct and leverage the private profile ML model by gathering user data, analyzing the user data, training the private profile ML model, continuously enriching the private profile ML model using user data from each ecommerce website visit in which the user provides access to the model, and providing product recommendations using the trained private profile ML model.

The present invention may contain various accessible data sources, such as server 110 and client device 120, that may include personal data, content, or information the user wishes not to be processed. Personal data includes personally identifying information or sensitive personal information as well as user information, such as height, weight etc. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Private profile model construction program 112 enables the authorized and secure processing of personal data. Private profile model construction program 112 provides informed consent, with notice of the collection of personal data, allowing the user to opt in or opt out of processing personal data.

Consent by a user can take several forms. Opt-in consent can impose on the user to take an affirmative action before personal data is processed. Alternatively, opt-out consent can impose on the user to take an affirmative action to prevent the processing of personal data before personal data is processed. Private profile model construction program 112 provides information regarding personal data and the nature (e.g., type, scope, purpose, duration, etc.) of the processing. Private profile model construction program 112 provides the user with copies of stored personal data. Private profile model construction program 112 allows the correction or completion of incorrect or incomplete personal data. Private profile model construction program 112 allows the immediate deletion of personal data.

The present invention will now be described in detail with reference to the Figures.

FIG. 1 depicts a functional block diagram illustrating distributed data processing environment 100, in accordance with an embodiment of the present invention. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes server 110, client device 120, web server 130, and private user storage 140 interconnected over network 105. In an embodiment, distributed data processing environment 100 represents a system that constructs private profile machine learning models for recommending products to a user. Network 105 can be, for example, a local area network (LAN), a wide area network (WAN) such as the Internet, or a combination of the two, and can include wired, wireless, or fiber optic connections. Network 105 can include one or more wired and/or wireless networks that are capable of receiving and transmitting data, voice, and/or video signals, including multimedia signals that include voice, data, and video information. In general, network 105 can be any combination of connections and protocols that will support communications between server 110, client device 120, web server 130, and private user storage 140. Distributed data processing environment 100 may include additional servers, computers, or other devices not shown.

Server 110 operates to run private profile model construction program 112. In the depicted embodiment, server 110 contains private profile model construction program 112. In some embodiments, server 110 can be a standalone computing device, a management server, a web server, or any other electronic device or computing system capable of receiving, sending, and processing data and capable of communicating with client device 120 and web server 130 via network 105. In other embodiments, server 110 represents a server computing system utilizing multiple computers as a server system, such as a cloud computing environment. In yet other embodiments, server 110 represents a computing system utilizing clustered computers and components (e.g., database server computers, application server computers, etc.) that act as a single pool of seamless resources when accessed within distributed data processing environment 100. Server 110 may include components as described in further detail in FIG. 3.

Private profile model construction program 112 operates to construct and train a private profile ML model for recommending products to a user, in which the private profile ML model is stored in a private storage of the user, e.g., private user storage 140. In the depicted embodiment, private profile model construction program 112 resides on server 110 with user interface 122 being a local app interface of private profile model construction program 112 running on client device 120. In other embodiments, private profile model construction program 112 may be run locally on client device 120 or on another device (not shown) provided that private profile model construction program 112 has access to network 105. In yet other embodiments, certain steps of private profile model construction program 112 can be run on server 110 and other steps private profile model construction program 112 can be run on client device 120 through client-side plug-in 124 or run on web server 130 provided that private profile model construction program 112 has access to network 105 to exchange information between server 110, client device 120, and web server 130. Private profile model construction program 112 is described in more detail below with reference to FIG. 2.

Client device 120 operates as a user computing device that can send and receive data. In some embodiments, client device 120 may be, but is not limited to, an electronic device, such as a laptop computer, a tablet computer, a netbook computer, a personal computer (PC), a desktop computer, a smart phone, a wearable computing device, or any programmable electronic device capable of running user interface 122 and client-side plugin 124 and communicating (i.e., sending and receiving data) with server 110 and/or private profile model construction program 112 via network 105. In some embodiments, computing device 120 represents one or more programmable electronic devices or combination of programmable electronic devices capable of executing machine readable program instructions and communicating with server 110, web server 130, and/or other computing devices within distributed data processing environment 100 via a network, such as network 105. In an embodiment, client device 120 represents one or more devices associated with one or more users. In the depicted embodiment, client device 120 includes user interface 122 and client-side plugin 124. Client-side plug-in 124 operates as a software plug-in for private profile model construction program 112 on client device 120. Client device 120 may include components as described in further detail in FIG. 3.

User interface 122 operates as a local user interface on client device 120 through which one or more users of client device 120 interact with client device 120. In some embodiments, user interface 122 is a local app interface of private profile model construction program 112 on client device 120. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from private profile model construction program 112 via network 105. In an embodiment, user interface 122 enables a user to send and receive data (i.e., to and from private profile model construction program 112 via network 105, respectively). In an embodiment, user interface 122 enables a user to enter user personal preferences for products, in which the personal preferences can be used by the private profile ML model to better predict product recommendations.

Private user storage 140 operates as a repository for data received, used, and/or output by private profile model construction program 112. Data received, used, and/or generated may include, but is not limited to, user data gathered based on user interactions/events on ecommerce website; user data inferred using ML techniques; product recommendations made by private profile ML model 142; and any other data received, used, and/or output by private profile model construction program 112. private user storage 140 can be implemented with any type of storage device capable of storing data and configuration files that can be accessed and utilized by client device 120, such as a hard disk drive, a database server, or a flash memory. In an embodiment, private user storage 140 is accessed by private profile model construction program 112 and/or client device 120 to store and/or to access the data. In the depicted embodiment, private user storage 140 contains private profile ML model 142. In another embodiment, private user storage 140 may reside on user's computing device, another computing device, server, cloud server, or spread across multiple devices elsewhere (not shown) within distributed data processing environment 100, provided that private user storage 140 has access to client device 120.

Web server 130 operates to run ecommerce web application 132. In some embodiments, web server 130 can be a standalone computing device, a management server, a web server, or any other electronic device or computing system capable of receiving, sending, and processing data and capable of communicating with client device 120 and/or server 110 via network 105. In other embodiments, web server 130 represents a server computing system utilizing multiple computers as a server system, such as a cloud computing environment. In yet other embodiments, web server 130 represents a computing system utilizing clustered computers and components (e.g., database server computers, application server computers, etc.) that act as a single pool of seamless resources when accessed within distributed data processing environment 100. In the depicted embodiment, web server 130 contains ecommerce web application 132. In an embodiment, ecommerce web application 132 is website a user accesses and registers their private profile model API endpoint with, in accordance with several embodiments of the present invention. Web server 130 may include components as described in further detail in FIG. 3.

Figure 2:
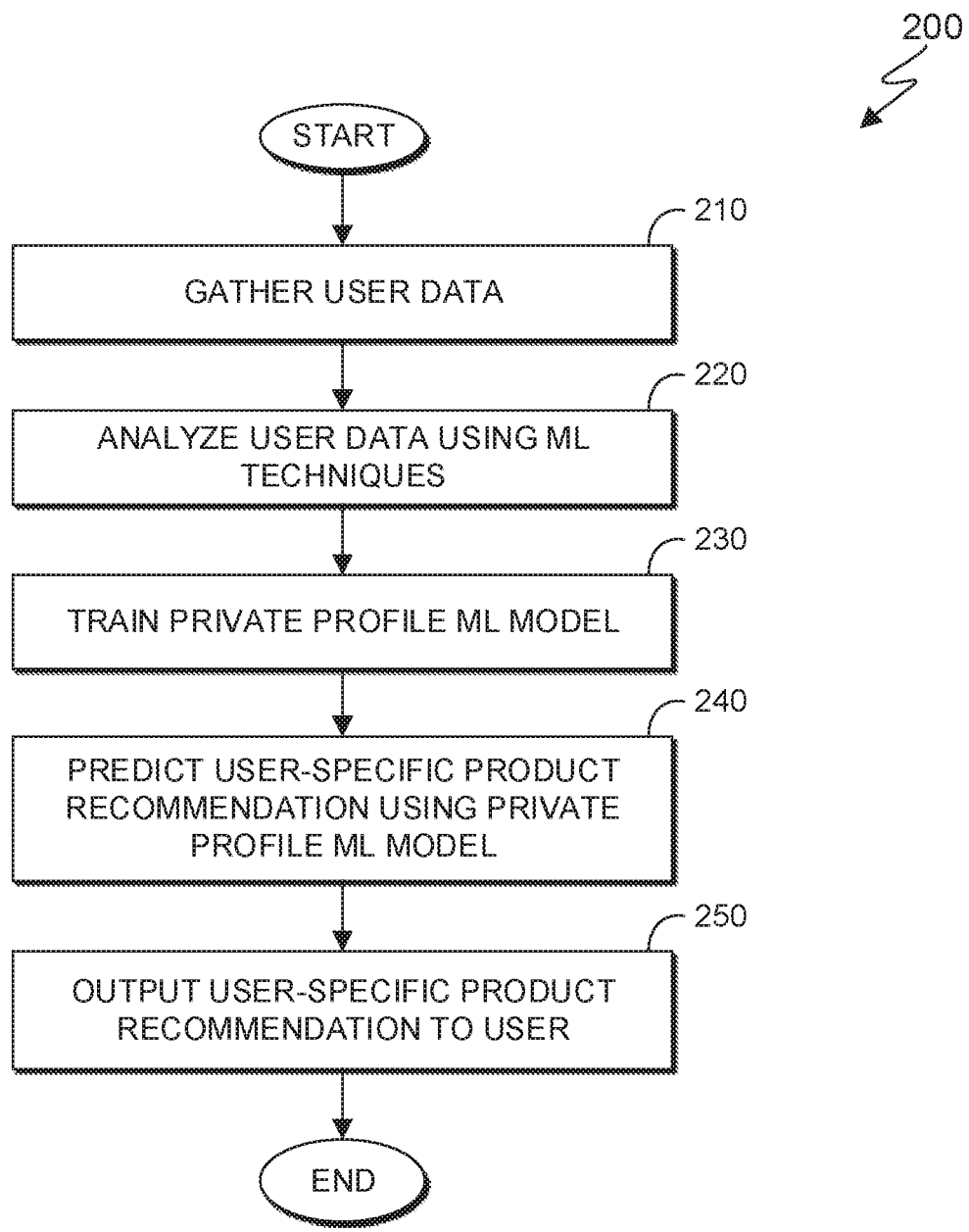
FIG. 2 depicts a flowchart of the steps of a private profile model construction program, for constructing private profile models using machine learning techniques for recommending products to a user, in accordance with an embodiment of the present invention.

FIG. 2 depicts a flowchart 200 of the steps of private profile model construction program 112, for constructing private profile ML models, in which the private profile ML models are stored in a private storage of the user, for recommending products to a user, in accordance with an embodiment of the present invention. In an embodiment, responsive to a user accessing an ecommerce site, private profile model construction program 112 gathers user data, analyzes the user data using ML techniques, trains a private profile ML model, predicts a user-specific product recommendation using the private profile ML model, and outputs the user-specific product recommendation to user. It should be appreciated that the process depicted in FIG. 2 illustrates one possible iteration of private profile model construction program 112.

In step 210, private profile model construction program 112 gathers user data. In an embodiment, private profile model construction program 112 gathers user data associated with interactions of the user on an ecommerce website. User data gathered by private profile model construction program 112 includes, but is not limited to, product images and/or text descriptions for products that the user interacted with while on the ecommerce website.

In an embodiment, responsive to a user accessing an ecommerce website, private profile model construction program 112 gathers user data. In an embodiment, responsive to a user, during a log-in/registration to the ecommerce website, providing details of the application program interface (API) for accessing the user's private profile ML model to the ecommerce site, private profile model construction program 112 gathers user data. Once the user provides the API, the ecommerce website can invoke the API that returns the private profile ML model to the ecommerce website for storing gathered user data, in which the API invocation can be secured using a token-based authorization mechanism.

In some embodiments, responsive to the user providing a location of the private profile ML model along with the API, in which the location can be a local storage of the user or a cloud storage of the user, and responsive to the ecommerce website invoking or activating the private profile ML model, private profile model construction program 112 gathers user data. In an embodiment, responsive to a user providing details of the API and/or the location of the private profile ML model, private profile model construction program 112 enables the ecommerce website to activate the private profile ML model for providing product recommendations to the user.

In one embodiment, private profile model construction program 112 gathers user data by injecting a JavaScript in the web application of the ecommerce website, which tracks user interactions and events and stores the gathered user data in a private storage of the user. In an embodiment, private profile model construction program 112 stores the gathered user data in a private storage of the user, e.g., private user storage 140. User interactions, events, and associated metadata include, but are not limited to, various html events, i.e., click of a link and/or button, and associated product information along with image URLs. In an embodiment, private profile model construction program 112 can apply a higher weightage to images/events that occur at an order confirmation page and a lower weightage to images/events that occur at a product catalogue page.

In another embodiment, in which the ecommerce site does not provide a JavaScript tracking the user's interactions, private profile model construction program 112 gathers user data by injecting a JavaScript as a plug-in at the client-side, which tracks user interactions, events, and associated metadata and stores the gathered user data in a private storage of the user. In an embodiment, private profile model construction program 112 stores the gathered user data in a private storage of the user, e.g., private user storage 140. User interactions, events, and associated metadata include, but are not limited to, various html events, i.e., click of a link and/or button, and associated product information along with image URLs. In an embodiment, private profile model construction program 112 can apply a higher weightage to images/events that occur at an order confirmation page and a lower weightage to images/events that occur at a product catalogue page.

In step 220, private profile model construction program 112 analyzes the user data using ML techniques. In an embodiment, responsive to private profile model construction program 112 gathering user data, private profile model construction program 112 analyzes the user data using ML techniques. In an embodiment, private profile model construction program 112 analyzes the private profile data stored in the private storage of the user. In an embodiment, private profile model construction program 112 analyzes product images of the user data using object detection, color detection, and text detection to identify the user's preferences for a particular product, i.e., product type, color, and/or pattern. In an embodiment, private profile model construction program 112 analyzes text descriptions of the user data using supervised text classification ML algorithms to capture more of the user's preferences from the metadata, i.e., price, size, return policy, user rating. In an embodiment, private profile model construction program 112 collects inferred data from the analyzed user data and stores the inferred data in the private storage of the user.

In step 230, private profile model construction program 112 trains a private profile ML model. In an embodiment, private profile model construction program 112 trains a private profile ML model stored in the private storage of the user. In an embodiment, private profile model construction program 112 trains the private profile ML model using the inferred data collected in the previous step. In an embodiment, responsive to private profile model construction program 112 analyzing the user data and collecting inferred data, private profile model construction program 112 trains the private profile ML model using the inferred data. In an embodiment, private profile model construction program 112 trains the private profile ML model to improve the accuracy of product recommendation predictions the private profile ML model produces. In an embodiment, private profile model construction program 112 trains the private profile ML model using the inferred data, the user's past purchase history, which can be obtained from the web application, and/or preferences manually input by the user.

In step 240, private profile model construction program 112 predicts a user-specific product recommendation using the private profile ML model. In an embodiment, private profile model construction program 112 enables the ecommerce website to use the private profile ML model in the user's private storage provided through the API invocation to predict product recommendations.

In step 250, private profile model construction program 112 outputs the user-specific product recommendation to user. In an embodiment, private profile model construction program 112 enables the ecommerce website to display product recommendations to the user. For example, the ecommerce web application can display a product recommendation in a separate private profile model-based product catalogue, i.e., a separate tab.

Embodiments of the present invention provide a system and method for constructing, training, and continuously enriching private profile models to be used by ecommerce websites to recommending products to a user, in which the private profile models are constructed, trained, and continuously enriched by analyzing the user's interaction with a respective e-commerce website using ML techniques. It is to be understood that the private profile model of a user can be utilized by any number of ecommerce websites once an API and/or location of the model is provided by the user. Every ecommerce website visited by the user can invoke the same private profile model to be able to provide product recommendations based on the continuously collected user data that is analyzed using ML techniques to continuously enrich the private profile model.

Figure 3:
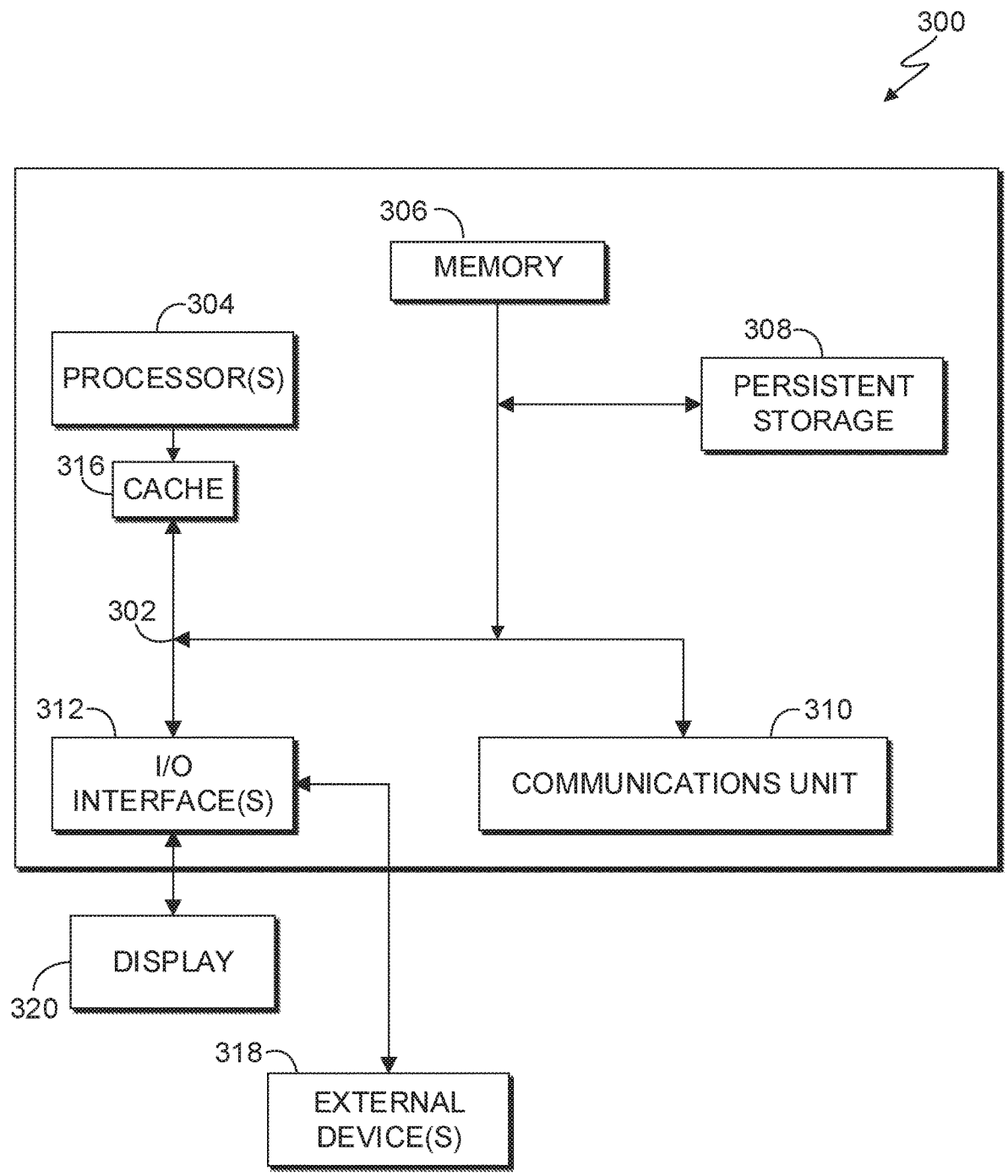
FIG. 3 depicts a block diagram of a computing device of the distributed data processing environment, in accordance with an embodiment of the present invention.

FIG. 3 depicts a block diagram of components of computing device 300 suitable for server 110, client device 120, and/or web server 130 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to server 110 and/or computing device 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for constructing private profile machine learning models for recommending products to a user, the computer-implemented method comprising:
    responsive to the user during a registration to an ecommerce website providing an application program interface (API) and location of a private storage of the user for storing user data, enabling, by one or more processors, the ecommerce website to invoke the API to gather the user data associated with interactions of the user on the ecommerce website, wherein the private storage of the user is a local storage of the user or a cloud storage of the user;
    analyzing, by the one or more processors, the user data stored on the private storage using machine learning (ML) techniques;
    training, by the one or more processors, a private profile ML model that is stored on the private storage of the user using the analyzed user data to predict product recommendations for the user;
    responsive to the user browsing the ecommerce website, enabling, by the one or more processors, the ecommerce website to activate the trained private profile ML model to provide the predicted product recommendations for the user;
    responsive to the user during a second registration to a different ecommerce website providing the API and the location of the private storage of the user for storing second user data, enabling, by the one or more processors, the different ecommerce website to invoke the API to gather the second user data associated with interactions of the user on the different ecommerce website;
    updating, by the one or more processors, the private profile ML model using the second user data to predict second product recommendations associated with the different ecommerce website for the user; and
    responsive to the user browsing the different ecommerce website, enabling, by the one or more processors, the different ecommerce website to activate the private profile ML model to provide the second product recommendations to the user.

2. The computer-implemented method of claim 1, wherein the user data includes product images and text descriptions of products that the user interacted with on the ecommerce website.

3. The computer-implemented method of claim 1, wherein enabling the at least one ecommerce website to invoke the API to gather the user data comprises:
    injecting, by the one or more processors, a JavaScript in a web application of the ecommerce website that tracks interactions and events of the user and stores the interactions and the events of the user as the user data in the private storage of the user.

4. The computer-implemented method of claim 1, wherein analyzing the user data stored on the private storage using the ML techniques comprises:
    analyzing, by the one or more processors, product images of the user data using object detection, color detection, and text detection to identify preferences of the user for a particular product, wherein the preferences include at least one of product type, color, and pattern; and
    analyzing, by the one or more processors, text descriptions of the user data using supervised text classification ML algorithms to capture additional preferences of the user from metadata of the text descriptions, wherein the additional preferences include at least one of price, size, return policy, and user rating.

5. The computer-implemented method of claim 1, further comprising:
   collecting, by the one or more processors, inferred data based on the analyzed user data; and
   wherein training the private profile ML model comprises:
      training, by the one or more processors, the private profile ML model using the inferred data.

6. The computer-implemented method of claim 1, wherein analyzing the user data stored on the private storage using the ML techniques comprises:
   applying, by the one or more processors, a higher weightage to images and events that occur at an order confirmation page than a weightage applied to images and events that occur at a product catalogue page.

7. A computer program product for constructing private profile machine learning models for recommending products to a user, the computer program product comprising:
   one or more computer readable storage media and program instructions stored on the one or more computer readable storage media, the program instructions comprising:
   program instructions to, responsive to the user during a registration to an ecommerce website providing an application program interface (API) and location of a private storage of the user for storing user data, enable the ecommerce website to invoke the API to gather the user data associated with interactions of the user on the ecommerce website, wherein the private storage of the user is a local storage of the user or a cloud storage of the user;
   program instructions to analyze the user data stored on the private storage using machine learning (ML) techniques;
   program instructions to train a private profile ML model that is stored on a private storage of the user using the analyzed user data to predict product recommendations for the user;
   responsive to the user browsing the ecommerce website, enabling, by the one or more processors, the ecommerce website to activate the trained private profile ML model to provide the predicted product recommendations for the user;
   program instructions to, responsive to the user during a second registration to a different ecommerce website providing the API and the location of the private storage of the user for storing second user data, enable the different ecommerce website to invoke the API to gather the second user data associated with interactions of the user on the different ecommerce website;
   program instructions to update the private profile ML model using the second user data to predict second product recommendations associated with the different ecommerce website for the user; and
   program instructions to, responsive to the user browsing the different ecommerce website, enable the different ecommerce website to activate the private profile ML model to provide the second product recommendations to the user.

8. The computer program product of claim 7, wherein the user data includes product images and text descriptions of products that the user interacted with on the ecommerce website.

9. The computer program product of claim 7, wherein the program instructions to enable the at least one ecommerce website to invoke the API to gather the user data comprise:
   program instructions to inject a JavaScript in a web application of the ecommerce website that tracks interactions and events of the user and stores the interactions and the events of the user as the user data in the private storage of the user.

10. The computer program product of claim 7, wherein the program instructions to analyze the user data stored on the private storage using the ML techniques comprise:
   program instructions to analyze product images of the user data using object detection, color detection, and text detection to identify preferences of the user for a particular product, wherein the preferences include at least one of product type, color, and pattern; and
   program instructions to analyze text descriptions of the user data using supervised text classification ML algorithms to capture additional preferences of the user from metadata of the text descriptions, wherein the additional preferences include at least one of price, size, return policy, and user rating.

11. The computer program product of claim 7, further comprising:
   program instructions to collect inferred data based on the analyzed user data; and
   wherein the program instructions to train the private profile ML model comprise:
      program instructions to train the private profile ML model using the inferred data.

12. The computer program product of claim 7, wherein the program instructions to analyze the user data stored on the private storage using the ML techniques comprise:
   program instructions to apply a higher weightage to images and events that occur at an order confirmation page than a weightage applied to images and events that occur at a product catalogue page.

13. A computer system for constructing private profile machine learning models for recommending products to a user, the computer system comprising:
   one or more computer processors;
   one or more computer readable storage media;
   program instructions stored on the computer readable storage media for execution by at least one of the one or more processors, the program instructions comprising:
   program instructions to, responsive to the user during a registration to an ecommerce website providing an application program interface (API) and location of a private storage of the user for storing user data, enable the ecommerce website to invoke the API to gather the user data associated with interactions of the user on the ecommerce website, wherein the private storage of the user is a local storage of the user or a cloud storage of the user;
   program instructions to analyze the user data stored on the private storage using machine learning (ML) techniques;
   program instructions to train a private profile ML model that is stored on a private storage of the user using the analyzed user data to predict product recommendations for the user;
   responsive to the user browsing the ecommerce website, enabling, by the one or more processors, the ecommerce website to activate the trained private profile ML model to provide the predicted product recommendations for the user;

program instructions to, responsive to the user during a second registration to a different ecommerce website providing the API and the location of the private storage of the user for storing second user data, enable the different ecommerce website to invoke the API to gather the second user data associated with interactions of the user on the different ecommerce website;

program instructions to update the private profile ML model using the second user data to predict second product recommendations associated with the different ecommerce website for the user; and program instructions to, responsive to the user browsing the different ecommerce website, enable the different ecommerce website to activate the private profile ML model to provide the second product recommendations to the user.

14. The computer system of claim 13, wherein the user data includes product images and text descriptions of products that the user interacted with on the ecommerce website.

15. The computer system of claim 13, wherein the program instructions to enable the at least one ecommerce website to invoke the API to gather user data comprise:

program instructions to inject a JavaScript in a web application of the ecommerce website that tracks interactions and events of the user and stores the interactions and the events of the user as the user data in the private storage of the user.

16. The computer system of claim 13, wherein the program instructions to analyze the user data stored on the private storage using ML techniques comprise:

program instructions to analyze product images of the user data using object detection, color detection, and text detection to identify preferences of the user for a particular product, wherein the preferences include at least one of product type, color, and pattern; and program instructions to analyze text descriptions of the user data using supervised text classification ML algorithms to capture additional preferences of the user from metadata of the text descriptions, wherein the additional preferences include at least one of price, size, return policy, and user rating.

17. The computer system of claim 13, wherein the program instructions to analyze the user data stored on the private storage using the ML techniques comprise:

program instructions to apply a higher weightage to images and events that occur at an order confirmation page than a weightage applied to images and events that occur at a product catalogue page.

* * * * *